United States Patent
Wada et al.

(10) Patent No.: US 7,745,776 B2
(45) Date of Patent: Jun. 29, 2010

(54) PHOTO DETECTING APPARATUS COMPRISING A CURRENT CONTROL ELEMENT

(75) Inventors: Atsushi Wada, Ogaki (JP); Kuniyuki Tani, Ogaki (JP); Hajime Takashima, Atsugi (JP)

(73) Assignee: Sanyo Electric Co., Ltd., Osaka (JP)

( * ) Notice: Subject to any disclaimer, the term of this patent is extended or adjusted under 35 U.S.C. 154(b) by 158 days.

(21) Appl. No.: 11/864,286

(22) Filed: Sep. 28, 2007

(65) Prior Publication Data

US 2008/0079044 A1      Apr. 3, 2008

(30) Foreign Application Priority Data

Sep. 28, 2006   (JP) ............................. 2006-265476

(51) Int. Cl.
*H01L 31/062*    (2006.01)
(52) U.S. Cl. ............................... 250/214 R; 250/214.1; 250/208.1; 327/514; 327/108; 257/292; 257/E31.001
(58) Field of Classification Search ............. 250/214 R, 250/214.1, 208.1; 327/514–515, 108–109; 257/292, E31.001
See application file for complete search history.

(56) References Cited

U.S. PATENT DOCUMENTS 5,742,047 A * 4/1998 Buhler et al. ........... 250/214 R

FOREIGN PATENT DOCUMENTS

| JP | 2001-352052 |       | 12/2001 |
| JP | 2003-018471 | A     | 1/2003  |
| JP | 2006-505159 | A     | 2/2006  |

OTHER PUBLICATIONS

Japanese Office Action for JP 2006-265476 (with English translation), Oct. 14, 2008, pp. 1-4, Japan.

* cited by examiner

*Primary Examiner*—Seung C Sohn
(74) *Attorney, Agent, or Firm*—Ditthavong, Mori & Steiner, P.C.

(57) ABSTRACT

In a photo detecting apparatus, a first capacitance is caused by a photo detecting element and the first capacitance is charged or discharged by current flowing through the photo detecting element. A second capacitance is connected in parallel with the photo detecting element, and the second capacitance charges or discharges an electric charge overflowing from the first capacitance. A current control element is connected to a terminal of the second capacitance on a side where the electric charge flows in, and the current control element delivers a current to cancel part of an electric charge when the electric charge overflowing from the first capacitance is stored in the second capacitance.

8 Claims, 10 Drawing Sheets

PHOTO DETECTING APPARATUS COMPRISING A CURRENT CONTROL ELEMENT

CROSS-REFERENCE TO RELATED APPLICATIONS

This application is based upon and claims the benefit of priority from the prior Japanese Patent Application No. 2006-265476, filed on Sep. 28, 2006, the entire contents of which are incorporated herein by reference.

BACKGROUND OF THE INVENTION

1. Field of the Invention

The present invention relates to a CMOS image sensor and other photo detecting devices.

2. Description of the Related Art

In recent years, CCD (Charge Coupled Device) or CMOS (Complementary Metal Oxide Semiconductor) image sensors are used in a great deal of image pickup apparatuses, such as digital still cameras and digital video cameras.

A number of benefits can be gained by choosing a CMOS image sensor. For example, a CMOS image sensor can be produced on the same manufacturing line as general chips, and it can be packaged into a single chip together with the peripheral functions. Further, the CMOS image sensor is advantageous in that the CMOS image sensor can be driven at lower voltage than a CCD type and the CMOS image sensor consumes less power than the CCD type.

Each pixel of a CMOS sensor has a structure including a photodiode and a switch using MOSFETs. A solid-state image sensor equipped with an overflow drain that sweeps out an excess charge occurring in the photodiode has been proposed. When the overflow drain is provided, the charge amount stored can be increased and therefore a wider dynamic range can be achieved.

However, the provision of an overflow drain capacity in the pixel circuit increases the area of pixel circuits. Since low-cost image sensors need to be supplied for use in vehicles, there is an increasing demand of suppressing the increase in the area by the overflow drain capacity.

SUMMARY OF THE INVENTION

One embodiment of the present invention comprises: a photo detecting element which generates a current in response to incident light; a first capacitance, caused by the photo detecting element, which is charged or discharged by the current flowing through said photo detecting element; a second capacitance, connected in parallel with the photo detecting element, which charges or discharges an electric charge overflowing from the first capacitance; a current control element, connected to a terminal of the second capacitance on a side where the electric charge flows in, which causes a current to cancel part of an electric charge when the electric charge overflowing from the first capacitance is stored in the second capacitance; and a detection circuit which detects a signal corresponding to the electric charge stored in the first capacitance and the second capacitance.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Firstly, a description of a representative embodiment will be given before describing preferred embodiments of the present invention. A photo detecting apparatus according one embodiment of the present invention includes a photo detecting element which generates a current in response to incident light; a first capacitance, caused by the photo detecting element, which is charged or discharged by the current flowing through the photo detecting element; a second capacitance, connected in parallel with the photo detecting element, which charges or discharges an electric charge overflowing from the first capacitance; a current control element, connected to a terminal of the second capacitance on a side where the electric charge flows in, which causes a current to cancel part of an electric charge when the electric charge overflowing from the first capacitance is stored in the second capacitance; and a detection circuit which detects a signal corresponding to the electric charge stored in the first capacitance and the second capacitance. The "current control element" may start the flow of a current after the flow of electric charge has started from the photo detecting element to the second capacitance and then a predetermined period has elapsed. The photo detecting apparatus may further include a transistor which determines a level of terminal voltage of the "photo detecting element" and which electrically connects or disconnects the first capacitance and the second capacitance as a result thereof.

According to this embodiment, the amount of electric charge may be regulated according to the electric current, so that a dynamic range may be widened while limiting the scale of the circuit.

The current control element may be constituted by a P-channel transistor wherein a drain terminal thereof is connected to the second capacitance, a predetermined fixed potential is applied to a source terminal thereof, and the gate terminal and the drain terminal thereof are connected with each other by way of a diode. Also, the current control element may be constituted by an N-channel transistor wherein the source terminal thereof is connected to the second capacitance, a predetermined fixed potential is applied to the drain terminal thereof, and the gate terminal and the source terminal thereof are connected with each other by way of a diode. The "predetermined fixed potential" may be a supply voltage. According to this arrangement, a simple structure makes it possible to send a current that cancels part of the electric charge overflowing from the first capacitance.

The current control element may be formed of a transistor, and the gate voltage thereof may be controlled in such a manner as to control the current that cancels part of the electric charge overflowing from the first capacitance. Also, the current that cancels part of the electric charge overflowing from the first capacitance may be increased in stages by changing the gate voltage in stages. Such an arrangement may allow a more flexible adjustment of the amount of electric charge in correspondence to the current.

A photo detecting apparatus may be further provided with a current monitoring circuit for monitoring the current flowing from the current control element by use of a dummy capacitance and a dummy transistor provided corresponding to the second capacitance and the current control element, respectively, and a correction circuit for removing a signal component read out from the current monitoring circuit from the signal read out from the detection circuit. Such a configuration makes it possible to remove with accuracy the current sent to adjust the amount of electric charge. In particular, when the current is changed in stages, it is possible to reduce nonlinearity resulting from deviation from the design values between the different levels of current.

Another embodiment of the present invention also relates to a photo detecting apparatus. This photo detecting apparatus includes: a photo detecting element which generates a current in response to incident light; a capacitance caused by the photo detecting element, which is charged or discharged by the current flowing through the photo detecting element; a transistor which resets the capacitance by applying a predetermined fixed potential to the photo detecting element; and a detection circuit which detects a signal corresponding to the electric charge stored in the capacitance. The transistor causes a current to flow that cancels part of the electric charge when it is stored in the capacitance.

According to this embodiment, the amount of electric charge may be regulated according to the electric current, so that the dynamic range may be widened while limiting the scale of the circuit.

It is to be noted that any arbitrary combination of the above-described structural components and expressions replaced among a method, an apparatus, a system and so forth are all effective as and encompassed by the present embodiments.

A photo detecting apparatus according to an embodiment of the present invention is a CMOS image sensor which has a plurality of pixel circuits disposed in m rows and n columns therein. Hereinbelow, a description will be given of a structure of each pixel circuit 100.

First Embodiment

Figure 1:
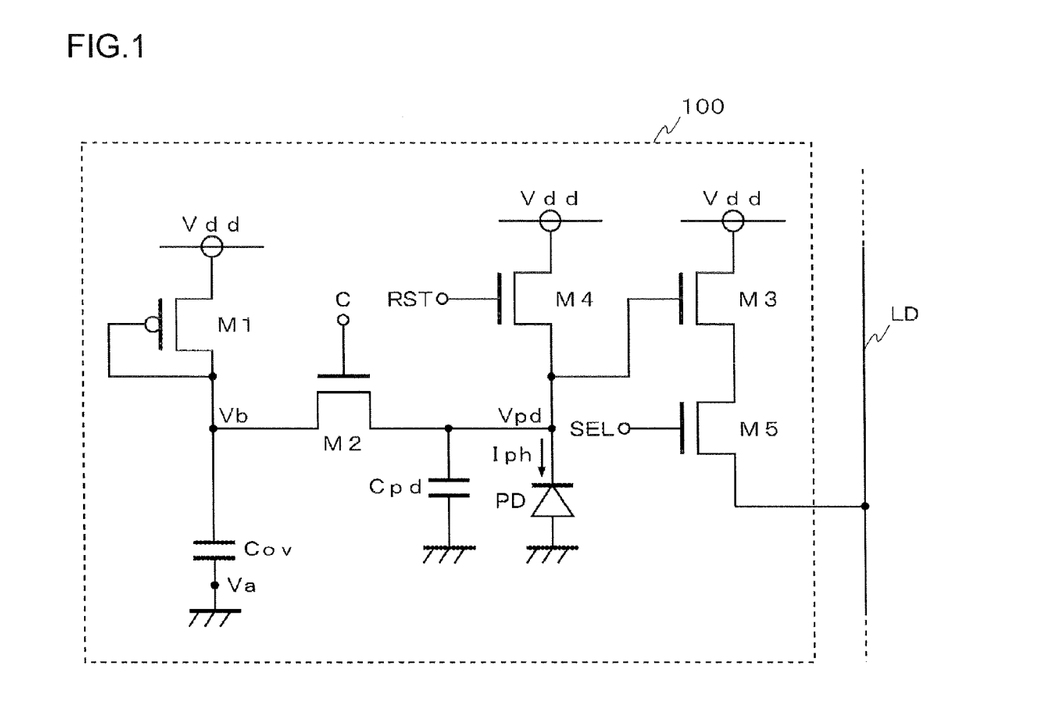
FIG. 1 is a circuit diagram showing a structure of a pixel circuit according to a first embodiment of the present invention.

FIG. 1 is a circuit diagram showing a structure of a pixel circuit 100 according to a first embodiment of the present invention. This pixel circuit 100 includes, as a basic structure, a photodiode PD, a reset transistor M4, an amplifier transistor M3, and a selection transistor M5. Present at a cathode terminal of the photodiode PD are the photodiode PD's own parasitic capacitance and interwiring capacitance (Hereinafter these capacitances are referred to as cathode capacitance Cpd.). The reset transistor M4, the amplifier transistor M3, and the selection transistor M5 are all N-channel MOSFETs (Metal Oxide Semiconductor Field Effect Transistors). The reset transistor M4 and the photodiode PD are connected in series between supply voltage Vdd and ground voltage GND. A source terminal of the reset transistor M4 is connected to the photodiode PD, and the supply voltage Vdd is applied to a drain terminal thereof. A reset signal RST is inputted to a gate terminal of the reset transistor M4.

The cathode terminal of the photodiode PD, which is connected to the reset transistor M4, is connected to a gate terminal of the amplifier transistor M3. The amplifier transistor M3 functions as a source follower amplifier as the supply voltage Vdd is applied to a drain terminal thereof and a source terminal thereof is connected to a drain terminal of the selection transistor M5, thereby coupling the amplifier transistor M3 to a not-shown external constant-current source via the selection transistor M5. A source terminal of the selection transistor M5 is connected to a data line LD, which is provided to each of the columns of the CMOS image sensor. The amplifier transistor M3 and the selection transistor M5 function as a detector circuit for detecting a voltage according to the amount of light received by the photodiode PD.

In this structure, as the reset signal RST inputted to the gate terminal of the reset transistor M4 goes high, the reset transistor M4 turns on, the supply voltage Vdd is applied to the photodiode PD, and the cathode terminal thereof is charged by the supply voltage Vdd. Next the reset transistor M4 is turned off. In this state, as light hits the photodiode PD, a photocurrent Iph flows, and the electric charge stored in the cathode terminal of the photodiode PD is discharged. At this time, the voltage at the cathode terminal of the photodiode PD changes in relation to the light intensity and the charge storage time. The amplifier transistor M3 outputs the voltage at the cathode terminal of the photodiode PD. Now, after the passage of a predetermined storage time, having a selection signal SEL go high will turn on the selection transistor M5 and have a voltage according to the amount of light received by the photodiode PD outputted to the data line LD, and thus the amount of light received by each pixel circuit can be read by an external circuit.

A pixel circuit 100 according to the first embodiment includes a current control transistor M1, an overflow drain transistor M2, and an overflow drain capacitor Cov, in addition to the above-mentioned basic structure. The overflow drain capacitor Cov stores a charge overflowing from the photodiode PD while the overflow drain transistor M2 is conducting. The current control transistor M1 and the overflow drain capacitor Cov are connected in series between the supply voltage Vdd and the ground voltage GND. The current control transistor M1 is a P-channel MOSFET, and the supply voltage Vdd is applied to a source terminal thereof. A gate terminal and a drain terminal of the current control transistor M1 are diode-connected with each other.

The overflow drain capacitor Cov is provided between the drain terminal of the current control transistor M1 and the ground voltage GND. The overflow drain transistor M2 is an N-channel MOSFET, and a drain terminal thereof is connected to the drain terminal of the current control transistor M1 whereas a source terminal of the overflow drain transistor M2 is connected to the cathode terminal of the photodiode PD. A control signal C is inputted to a gate terminal of the overflow drain transistor M2.

Figure 2:
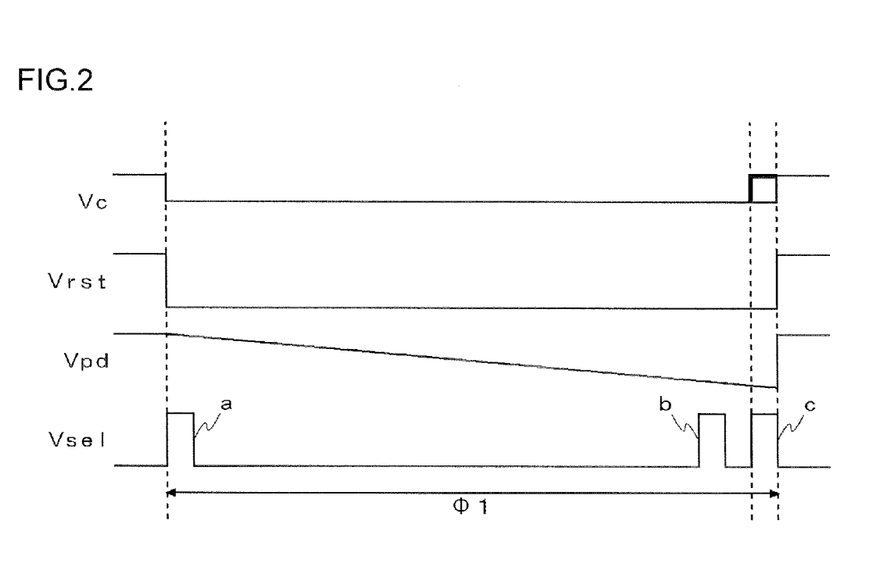
FIG. 2 is an operational sequence diagram of a pixel circuit according to a first embodiment of the present invention.

FIG. 2 is an operational sequence diagram of a pixel circuit 100 according to the first embodiment. FIG. 2 shows a gate voltage Vc of the overflow drain transistor M2, a gate voltage Vrst of the reset transistor M4, a cathode voltage Vpd of the photodiode PD, and a gate voltage Vsel of the selector transistor M5. In an initial state, the overflow drain transistor M2 and the reset transistor M4 are on, and the selector transistor M5 is off. The cathode voltage Vpd of the photodiode PD is maintained at supply voltage Vdd.

To read out a reset level, a high-level signal a is inputted to the gate terminal of the selector transistor M5 so as to turn on the selector transistor M5 temporarily. Simultaneously with that, an exposure period φ1 starts, and an intermediate voltage, which is a predetermined bias voltage, is applied to the gate terminal of the overflow drain transistor M2. This creates a state in which the charges overflowing from the cathode capacitance Cpd can be stored in the overflow drain capacitor Cov. Now, when a low-level signal is inputted to the gate terminal of the reset transistor M4, the reset transistor M4 turns off. After the start of the exposure period φ1, the photodiode PD keeps storing electric charges according to the amount of light received, and the cathode voltage Vpd drops gradually.

When a preset period of time has elapsed from the start of the exposure period φ1, a high-level signal b is inputted to the gate terminal of the selector transistor M5, so that the selector transistor M5 turns on temporarily. A level deciding circuit (not shown) connected to the data line LD detects a cathode voltage Vpd at the photodiode PD. The voltage thus detected is used to predict whether an electric charge will be stored in the overflow drain capacitor Cov before the start of the next signal reading period or not. A designer may use an experiment or simulation to obtain a threshold voltage which is to be compared with the detected voltage.

Where the detected voltage indicates that an electric charge is stored in the overflow drain capacitor Cov or it predicts that an electric charge will be stored before the start of a signal reading period, the level deciding circuit inputs a high-level signal (indicated in a bold line in FIG. 2) to the overflow drain transistor M2, thereby turning the overflow drain transistor M2 on. This makes it possible to read out a signal based on the combined charge stored in the cathode capacitance Cpd and the overflow drain capacitor Cov, during the signal reading period.

On the other hand, where the detected voltage indicates that electric charge is not stored in the overflow drain capacitor Cov and besides it predicts that the electric charge will not be stored before the start of a signal reading period, the level deciding circuit maintains the gate voltage of the overflow drain transistor M2 at a value of intermediate voltage. Otherwise, the level deciding circuit may turn off the overflow drain transistor M2 completely by inputting a low-level signal to the gate terminal thereof. This makes it possible to read out a signal based on the charge stored in the cathode capacitance Cpd only, during the signal reading period.

Prior to the end of the exposure period φ1, a high-level signal c for detecting the cathode voltage Vpd of the photodiode PD is inputted to the gate terminal of the selector transistor M5, so that the selector transistor M5 turns on temporarily. A signal, which is the cathode voltage Vpd at this time amplified by the amplifier transistor M3, is read out to the data line LD. Note that when it is determined that a high illuminance condition will last due to the presence of a not-shown subsequent processor or the like, the overflow drain transistor M2 may be kept constantly on completely to simply combine the overflow drain capacitor Cov.

Figure 3:
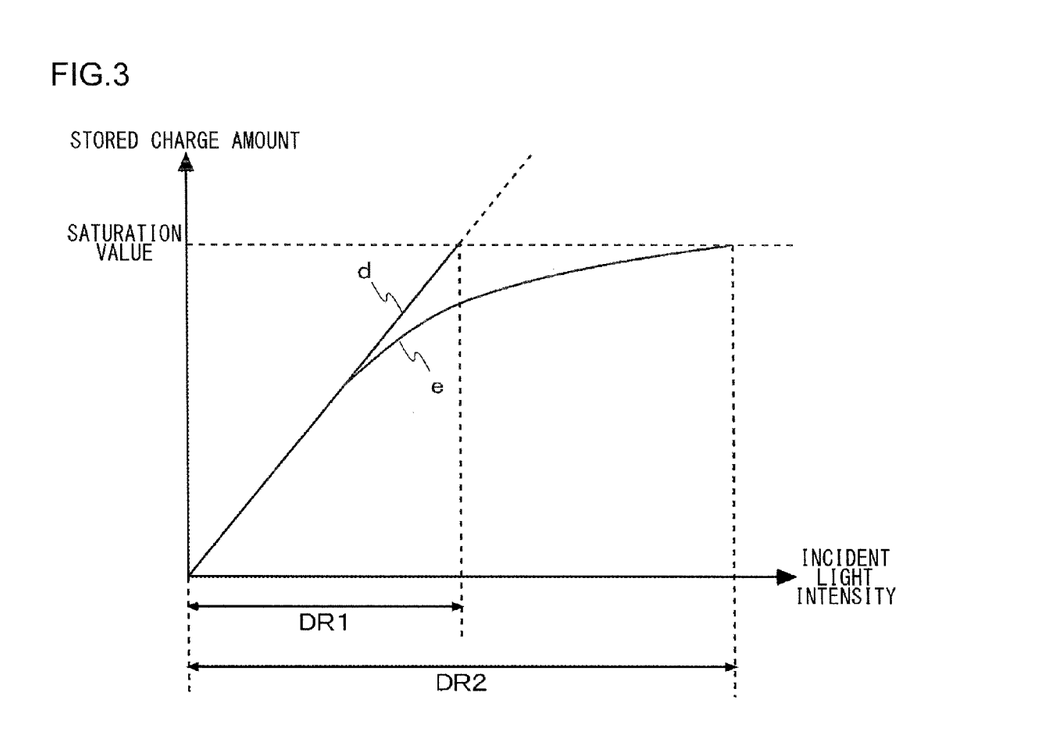
FIG. 3 is a diagram showing a relationship between incident light intensity and stored charge amount at an overflow drain capacitor according to a first embodiment of the present invention.

FIG. 3 is a diagram showing a relationship between incident light intensity and stored charge amount at the overflow drain capacitor Cov according to the first embodiment. The cathode voltage Vpd drops in proportion to the intensity of light incident on the photodiode PD. Along with that, the overflow drain transistor M2 turns on, and the drain voltage of the current control transistor M1 also drops. Since the gate terminal and the drain terminal of the current control transistor M1 are diode-connected, the relationship between the incident light intensity and the stored charge amount is linear in the beginning but halfway begins changing in a quadratic-curve manner as represented by characteristic e in FIG. 3. This is because when the intensity of light reaches a certain level, the drain voltage Vb drops, the current control transistor M1 turns gradually on, and thus current I flows. With the drain voltage Vb further dropping, it is possible to allow even larger current I to flow. It should be noted that the characteristic curve defining the relationship between incident light intensity and stored charge amount can be designed arbitrarily by adjusting the characteristics, such as gate length or gate width, of the current control transistor M1.

In this arrangement, the amount of charge stored in the cathode capacitance Cpd and the overflow drain capacitor Cov is (Iph−I)t, so that the larger the current I that is allowed to flow, the less the stored charge amount of the overflow drain capacitor Cov will be. Here Iph is a photocurrent flowing through the photodiode PD, I a current that is caused to flow by the current control transistor M1, and t a storage time. In this manner, the current caused to flow by the current control transistor M1 acts as a current that cancels the photocurrent flowing through the photodiode PD. This current control transistor M1 works on the side of the overflow drain capacitor Cov only, so that widening the dynamic range on the higher illuminance side by sending the current I will have no influence on the readout characteristics at lower illuminances. It should be understood here that in order to obtain an actual amount of light received, the current flowing through the current control transistor M1 needs to be removed as an offset component in a subsequent stage. Also, this current may be removed using a dummy pixel circuit 110 and a subtraction circuit 120 which will be discussed later.

In contrast to this, where the current control transistor M1 is not provided or where the current is not allowed to flow despite the presence of the transistor, the relationship between the incident light intensity and the stored charge amount represents a linear response up to the saturation value as indicated by characteristic d in FIG. 3. A dynamic range DR1 in this case will be narrower than a dynamic range DR2 for which the current is delivered by the use of a current control transistor M1.

As described above, according to the first embodiment, it is possible to adjust the amount of charge to be stored in the overflow drain capacitor Cov by connecting a diode-connected P-channel MOSFET to the terminal of the overflow drain capacitor Cov, which is on the side where the overflow drain capacitor Cov is coupled to the cathode terminal of the photodiode PD. That is, when the voltage at said terminal drops due to a rise in incident light intensity, the amount of current is increased automatically, so that said voltage will drop in a gentler slope. Hence, the above-mentioned terminal voltage will not drop easily for the same intensity of light, which means that the stored charge amount will not saturate easily. As a result, the same dynamic range can be realized by a smaller capacitance. Thus, the first embodiment can achieve a wider dynamic range while reducing the increase in circuit area.

Second Embodiment

Figure 4:
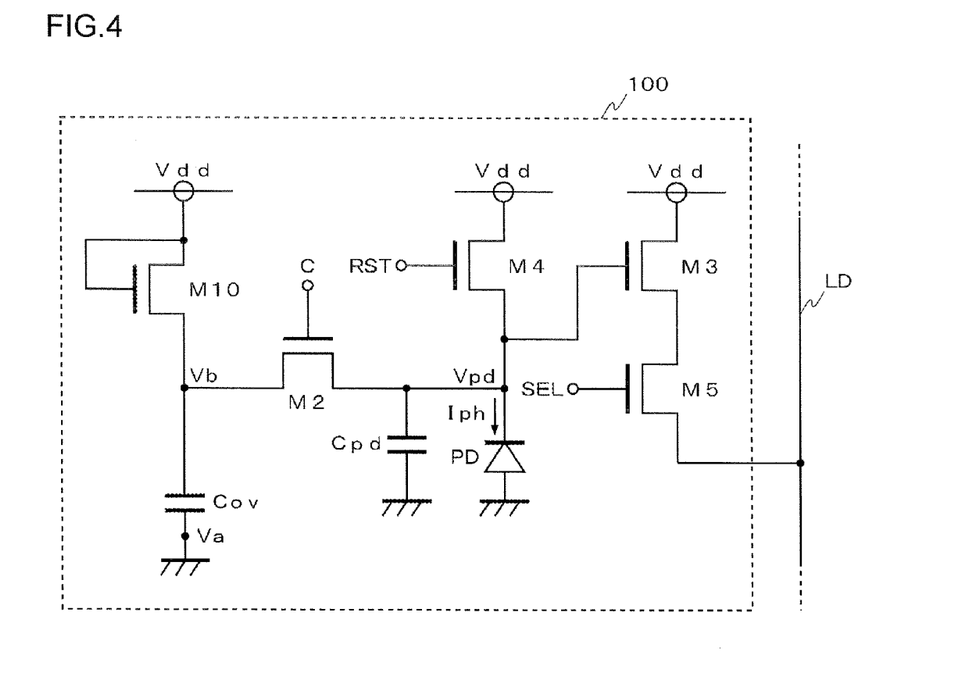
FIG. 4 is a circuit diagram showing a structure of a pixel circuit according to a second embodiment of the present invention.

FIG. 4 is a circuit diagram showing a structure of a pixel circuit 100 according to a second embodiment of the present invention. Note that the components of the pixel circuit 100 according to the second embodiment identical to those of the pixel circuit 100 according to the first embodiment are given the identical reference numerals and the repeated description thereof will be omitted as appropriate. Hereinbelow, the differences only will be described.

The pixel circuit 100 according to the second embodiment uses a current control transistor M10, which is an N-channel MOSFET, instead of the current control transistor M1, which is a P-channel MOSFET, in the pixel circuit 100 according to the first embodiment. The supply voltage Vdd is applied to a drain terminal of the current control transistor M10, and one end of an overflow drain capacitor Cov is coupled to a source terminal of the current control transistor M10. The gate terminal and the drain terminal of the current control transistor M10 are diode-connected with each other.

The relationship between incident light intensity and stored charge amount at the overflow drain capacitor Cov according to the second embodiment is the same as one shown in FIG. 3. That is, as the incident light intensity rises, the overflow drain transistor M2 turns on, and the source voltage of the current control transistor M10 drops. Along with this, a gate-source voltage of the current control transistor M10 keeps rising, and the current control transistor M10 turns on gradually, thereby causing current I to flow.

As described above, according to the second embodiment, the effects similar to those of the first embodiment may be achieved by the use of an N-channel MOSFET.

Third Embodiment

Figure 5:
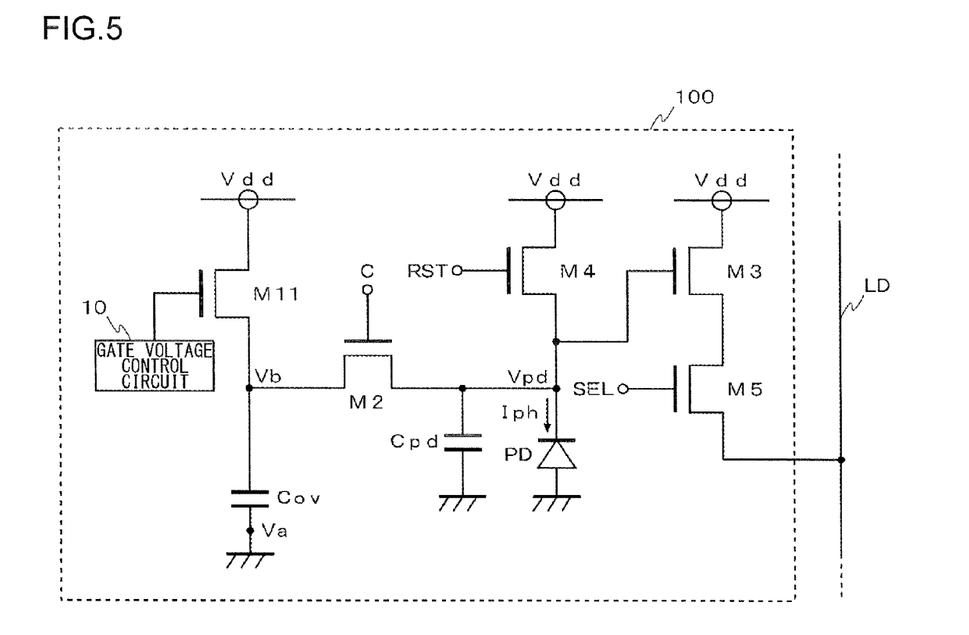
FIG. 5 is a circuit diagram showing a structure of a pixel circuit according to a third embodiment of the present invention.

FIG. 5 is a circuit diagram showing a structure of a pixel circuit 100 according to a third embodiment of the present invention. Note that the components of the pixel circuit 100 according to the third embodiment identical to those of the pixel circuit 100 according to the second embodiment are given the identical reference numerals and the repeated description thereof will be omitted as appropriate. Hereinbelow, the differences only will be described.

In the first and second embodiments, a characteristic of a diode-connected MOSET is utilized to send a current to adjust the stored charge amount. In the third embodiment, on the other hand, a designer may arbitrarily set the timing of delivering the current and value of the current by controlling the gate voltage to be applied to the gate terminal of the MOSFET.

The pixel circuit 100 according to the third embodiment includes a gate voltage control circuit 10. The gate voltage control circuit 10 controls a bias voltage to be applied to the gate terminal of the current control transistor M11.

Figure 6:
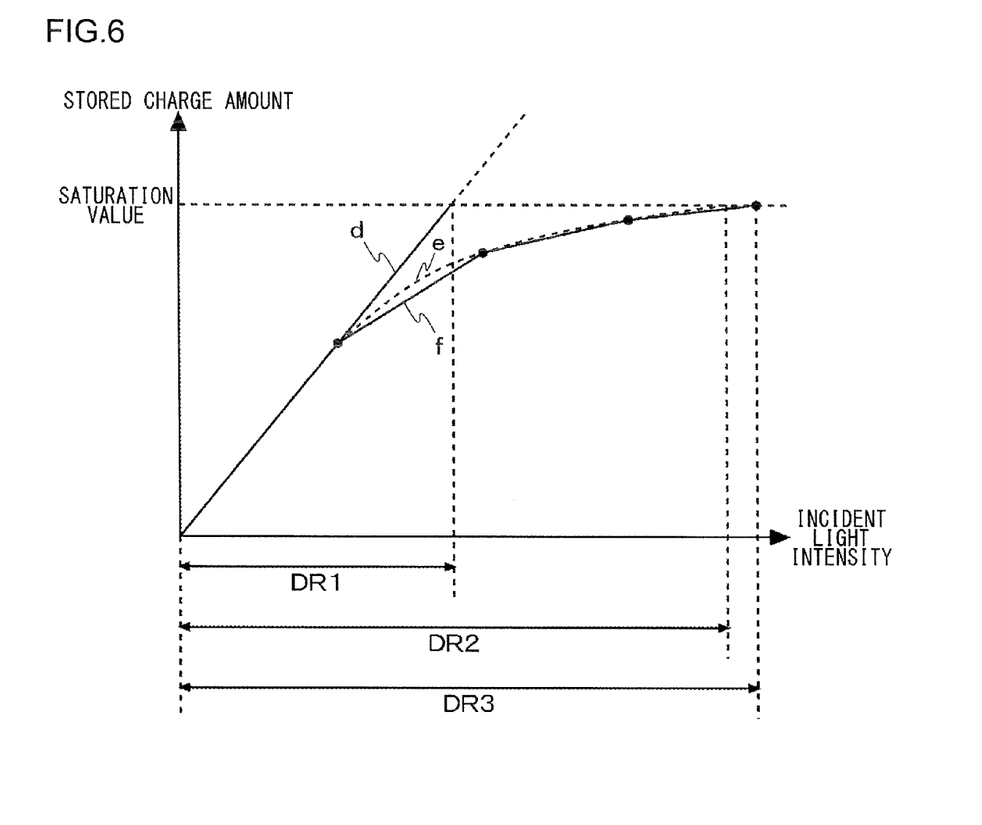
FIG. 6 is a diagram showing a relationship between incident light intensity and stored charge amount at an overflow drain capacitor according to a third embodiment of the present invention.

FIG. 6 is a diagram showing a relationship between incident light intensity and stored charge amount at an overflow drain capacitor Cov according to the third embodiment. The cathode voltage Vpd drops in proportion to the intensity of light incident on the photodiode PD. Along with that, the overflow drain transistor M2 turns on, and the source voltage of the current control transistor M11 also drops. The gate voltage control circuit 10 can cause a predetermined amount of current to flow by turning the current control transistor M11 on by raising the gate voltage with predetermined timing.

By allowing a predetermined amount of current to flow, the slope of characteristic f representing the relationship between the incident light intensity and the stored charge amount in FIG. 6 can be made gentler. By further raising the gate voltage with predetermined timing, the gate voltage control circuit 10 can increase the amount of current and thus make the slope of characteristic f even gentler. In this manner, the gate voltage control circuit 10 can raise the amount of current in stages by raising the gate voltage in stages. Depending on the setting, it is possible to realize a dynamic range DR3 which is wider than a dynamic range DR2 with the MOSFET diode-connected.

This gradual control may be used in combination with multi-exposure control. Multi-exposure control is a control of gradually shortening an exposure period of time during which the saturation occurs, until an exposure period of time when no saturation occurs. The gate voltage control circuit 10 may increase the amount of current by raising the gate voltage in linkage with the switching timing of the exposure time.

Figure 7:
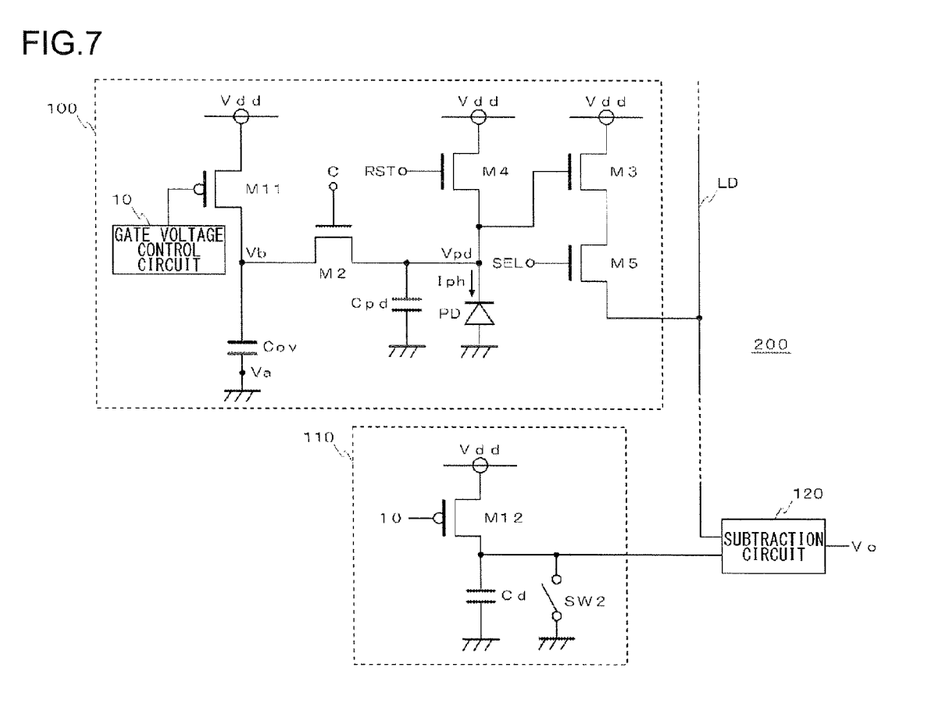
FIG. 7 is a circuit diagram showing a structure of a photo detecting apparatus provided with a pixel circuit according to a third embodiment of the present invention.

FIG. 7 is a circuit diagram showing a structure of a photo detecting apparatus 200 provided with a pixel circuit 100 according to the third embodiment. The photo detecting apparatus 200 includes a pixel circuit 100 according to the third embodiment, a dummy pixel circuit 110, and a subtraction circuit 120. The dummy pixel circuit 110 functions as a current monitoring circuit for monitoring a current sent by the current control transistor M11 in the pixel circuit 100 according to the third embodiment. Shown here is an example in which the current control transistor M11 is constructed by a P-channel MOSFET.

The dummy pixel circuit 110, which includes a dummy capacitor Cd, a dummy transistor M12, and a switch SW2, detects a control current sent by the current control transistor M11. Connected in series between the supply voltage Vdd and the ground voltage GND are the dummy transistor M12 and the dummy capacitor Cd. The dummy transistor M12 is a dummy element for the current control transistor M11, whereas the dummy capacitor Cd is a dummy element for the overflow drain capacitor Cov. The dummy transistor M12 has a drain terminal thereof coupled to one end of the dummy capacitor Cd; the supply voltage Vdd is applied to a source terminal thereof; and a bias voltage identical to one applied to the current control transistor M11 is applied to a gate terminal thereof from the gate voltage control circuit 10. The switch SW2 is connected between the ground GND and a path connecting a connection point between the dummy transistor M12 and the dummy capacitor Cd and the subtraction circuit 120. Note, however, that if the characteristic of the dummy capacitor Cd and the charge storage time are set the same way as for the overflow capacitor Cov, the possibility of saturation will increase, so that it may be necessary to employ a shorter storage period or a larger area of the dummy capacitor Cd. For example, the storage time may be set 1/10 of that for the overflow capacitor Cov, or the area of the dummy capacitor Cd may be ten times larger than that for the overflow capacitor Cov.

The dummy pixel circuit 110 operates as described below. Prior to the start of an exposure period for the pixel circuit 100, the switch SW2 is turned on, and the dummy capacitor Cd is reset to the ground voltage GND. Then, as the switch SW2 is turned off, the dummy capacitor Cd stores charge of the control current sent by the dummy transistor M12.

The subtraction circuit 120 functions as a correction circuit for correcting the output voltage of the pixel circuit 100 by subtracting the output voltage of the dummy pixel circuit 110 therefrom. The voltage after the correction, on account of a correction of the control current, assumes a voltage reflecting the actual amount of light received. These voltages are represented by Equations (1) to (3).

Output voltage of pixel circuit $100 = (Iph-Ict11)\Delta t/(Cpd+Cov)$  Equation (1)

Output voltage of dummy pixel circuit $110 = -Ict2/Cd \times 1/N \approx -Ict1/(Cpd+Cov) \times 1/N$  Equation (2)

Voltage after correction $= (Iph-Ict1)/(Cpd+Cov) - \{-Ict1/(Cpd+Cov) \times 1/N\} \times N = Iph/(Cpd+Cov)$  Equation (3)

where Iph is photocurrent flowing through the photodiode PD, Ict1 a current sent by the current control transistor M11, Δt a storage time, Ict2 a current sent by the dummy transistor M12, Cpd a capacitance value of the cathode capacitance Cpd, Cov a capacitance value of the overflow capacitor Cov, Cd a capacitance value of the dummy capacitor Cd, and N an adjusted value of area and storage time of the dummy capacitor Cd. As mentioned above, if the area of the dummy capacitor Cd is made ten times larger, then an adjustment is necessary in which the output voltage of the dummy pixel circuit 110 is increased by ten times.

It is to be noted that since the output voltage of the pixel circuit 100 is amplified by the amplifier transistor M3, there is a need to adjust one of the above-mentioned voltages. Such an adjustment is not represented in the above Equations (1) to (3). Also, the arrangement may be such that the output voltages of the pixel circuit 100 and the dummy pixel circuit 110 are converted into digital signals and thus the signals corresponding to the actual amount of received light are obtained as digital signals through digital operation.

As described above, according to the third embodiment, it is possible to adjust the amount of charge to be stored in the overflow drain capacitor Cov by connecting a MOSFET to the terminal of the overflow drain capacitor Cov, which is on the side where the overflow drain capacitor Cov is coupled to the cathode terminal of the photodiode PD and controlling the gate voltage thereof. Thus a wider dynamic range can be realized while suppressing the increase in circuit area. Also, this third embodiment provides greater freedom of design than the first and second embodiments. Moreover, the provision of a dummy pixel circuit makes it possible to remove with accuracy the current sent to increase the saturation charge amount.

Fourth Embodiment

Figure 8:
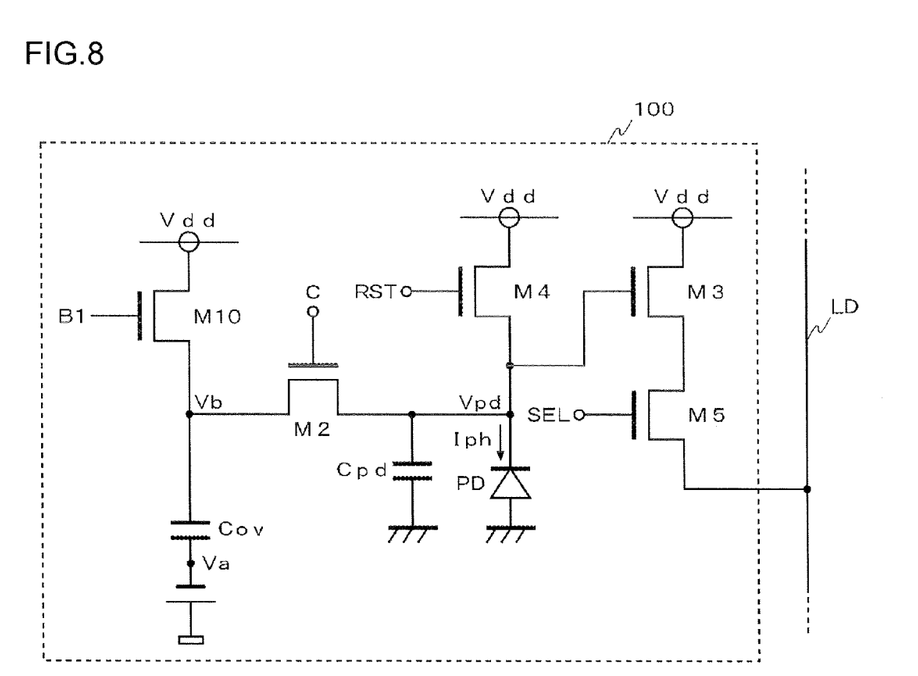
FIG. 8 is a circuit diagram showing a structure of a pixel circuit according to a fourth embodiment of the present invention.

FIG. 8 is a circuit diagram showing a structure of a pixel circuit 100 according to a fourth embodiment of the present invention. Note that the components of the pixel circuit 100 according to the fourth embodiment identical to those of the pixel circuit 100 according to the third embodiment are given the identical reference numerals and the repeated description thereof will be omitted as appropriate. Hereinbelow, the differences only will be described.

A fixed bias voltage B1 is applied to the gate terminal of the current control transistor M10. A negative voltage Va is applied to the terminal on a ground GND side of the overflow drain capacitor Cov. For example, a terminal at which the negative voltage is applied may be coupled to a negative electrode outside the pixel region via metal wiring. Also, the negative voltage Va, which is applied to the terminal of the overflow drain capacitor Cov on the side where electric charge does not flow in from the photodiode PD, may be controlled in relation to a cathode voltage Vpd detected during an exposure period. The cathode voltage Vpd may be detected by the aforementioned level deciding circuit. For example, when the detected cathode voltage Vpd goes beyond the above-mentioned threshold voltage, a not-shown terminal voltage controller may perform a control in such a manner as to further lower the above-mentioned negative voltage Va.

As described above, according to the fourth embodiment, the application of the negative voltage Va to the terminal on the ground GND side of the overflow drain capacitor Cov realizes a wider dynamic range while suppressing the increase in circuit area. Or it is also possible to reduce the circuit area while keeping a wide dynamic range. If, for instance, the application of the negative voltage to one end of the overflow drain capacitor Cov can create a potential difference twice as large as that when the ground GND voltage is applied, then the saturation charge amount can be doubled and the dynamic range can be widened by 6 dB. Also, for the same dynamic range, it is possible to reduce the area of the overflow drain capacitor Cov to half its original size. The increase in pixel area resulting from the wiring of a negative electrode has less effect than the reduced area of the overflow drain capacitor Cov, so that the area of the pixel circuit 100 can be reduced. Furthermore, if a control is performed to lower the above-mentioned negative voltage Va in relation to the state of terminal voltage of the photodiode PD, the dynamic range can be further widened while suppressing the increase in power consumption.

Fifth Embodiment

Figure 9:
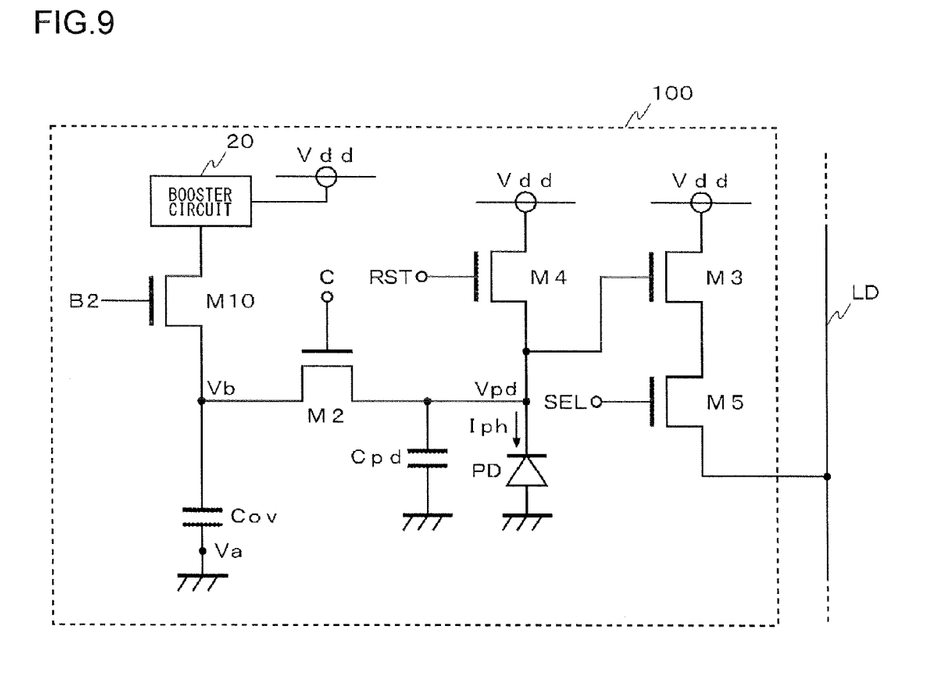
FIG. 9 is a circuit diagram showing a structure of a pixel circuit according to a fifth embodiment of the present invention.

FIG. 9 is a circuit diagram showing a structure of a pixel circuit 100 according to a fifth embodiment of the present invention. Note that the components of the pixel circuit 100 according to the fifth embodiment identical to those of the pixel circuit 100 according to the third embodiment are given the identical reference numerals and the repeated description thereof will be omitted as appropriate. Hereinbelow, the differences only will be described.

A booster circuit 20 boosts supply voltage Vdd. A voltage boosted by the booster circuit 20 is applied to the drain terminal of the current control transistor M10. A predetermined bias voltage B2 is applied to the gate terminal of the current control transistor M10. At least before the overflow grain transistor M2 turns on, the overflow drain capacitor Cov is reset at a voltage higher than the supply voltage Vdd by turning on the current control transistor M10. In this manner, the application of a voltage higher than the supply voltage Vdd to one end of the overflow drain capacitor Cov can create a potential difference larger than when the supply voltage Vdd is applied, so that the storage charge amount can be increased without increasing the circuit area.

As described above, according to the fifth embodiment, the application of a voltage higher than the supply voltage Vdd to one end of a photodiode PD side of the overflow drain capacitor Cov realizes a wider dynamic range while suppressing the increase in circuit area, on the same principle as the fourth embodiment. Or it is also possible to reduce the circuit area while keeping a wide dynamic range.

Sixth Embodiment

Figure 10:
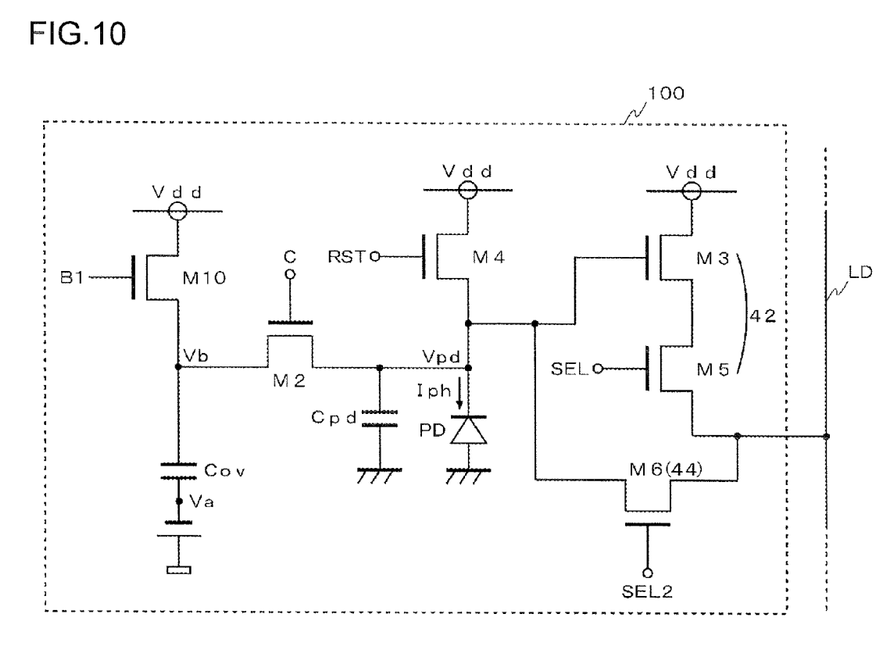
FIG. 10 is a circuit diagram showing a structure of a pixel circuit according to a sixth embodiment of the present invention.

FIG. 10 is a circuit diagram showing a structure of a pixel circuit 100 according to a sixth embodiment of the present invention. The description of the first to fifth embodiments has concerned the pixel circuit 100 of an active pixel sensor (APS) system. In the sixth embodiment, a description will be given of a pixel circuit 100 which is adaptable to a passive pixel sensor (PPS) system in addition to an APS system. It should be noted here that a component to realize a PPS system for the pixel circuit 100 according to the fourth embodiment is added in FIG. 10, but a similar arrangement may be applicable to the pixel circuit 100 according to the first, second, third, or fifth embodiment as well.

The pixel circuit 100 according to the sixth embodiment includes a first detector 42 and a second detector 44 as a detection circuit. This pixel circuit 100 is configured such that a first mode in which the first detector 42 becomes active and a second mode in which the second detector 44 becomes active are switchable with each other.

The first detector 42, which corresponds to the APS system, includes an amplifier transistor M3 and a selector transistor M5 as described earlier. The first detector 42 amplifies, by a source follower amplifier, a voltage appearing at the cathode capacitance Cpd caused by a photocurrent Iph flowing through the photodiode PD and outputs it to the data line LD.

The second detector 44 is constructed by including a charge output transistor M6. The charge output transistor M6 is provided on a path leading from the cathode terminal of the photodiode PD to a data line LDj to which the pixel circuit 100 is connected. The second detector 44, which corresponds to the PPS system, outputs via the data line LDj a charge stored in the cathode capacitance Cpd or the composite capacitance of the cathode capacitance Cpd and the overflow drain capacitor Cov by the photocurrent Iph flowing through the photodiode PD.

The APS system and the PPS system may be switched therebetween for use, depending on the amount of light received. The APS system, which allows amplification by the amplifier transistor M3, is suited for detection of relatively weak light. On the other hand, the PPS system, which is for high illuminance, is suited for detection of relatively strong light. The dynamic range can be expanded by adaptively switching these two systems for each pixel depending on the amount of light received. Note that the pixel circuit 100 may be constructed with the PPS system alone and, in such a case, it is not necessary to provide a first detector 42.

As described above, according to the sixth embodiment, a pixel circuit 100 employing an overflow drain capacitor Cov can be used for a PPS system. The PPS system, which provides storage time rather easily, can make the circuit less complex, smaller in scale, and less power-consuming. This sixth embodiment thus provides these advantageous effects while realizing a wider dynamic range. Also, with the PPS system, not the voltage but the charge can be amplified by the use of a not-shown charge amplifier provided outside the pixel circuit 100, so that there is no need for charge-voltage conversion within the pixel circuit 100. Hence, there is no voltage limitation at the conversion, and the charge can be stored in the pixel circuit 100 with greater efficiency. In this case, there is no need to use an overflow capacitor Cov of high accuracy, and thus a larger capacitance may be secured within the same area. This naturally makes it easier to realize a wide dynamic range. Also, the use of a configuration which allows switching between the APS system and the PPS system makes it possible to widen the dynamic range even wider.

The present invention has been described based on several embodiments. These embodiments are merely exemplary, and it is understood by those skilled in the art that various modifications to the combination of each component and each process thereof are possible and that such modifications are also within the scope of the present invention.

In the third embodiment, a configuration in which the overflow drain capacitor Cov, the overflow drain transistor M2, and the current control transistor M10 are not provided is also possible. The gate voltage control circuit 10 controls the gate voltage of the reset transistor In the previous description, the reset transistor M4 is turned off during the storage period of the photodiode PD. In this modification, however, during the period, a current is delivered to the reset transistor M4, with the current control transistor M10 controlling the gate voltage of the reset transistor M4. The current, similar to the one delivered by the current control transistor M11, acts as a current for adjusting the amount of charge to be stored in the cathode capacitance Cpd.

According to this modification, the reset transistor M4 can be utilized as a current control element capable of sending a current that cancels part of the photocurrent Iph flowing through the photodiode PD, so that the same advantageous effect as in the third embodiment can be produced and in addition the circuit area can be reduced. This proves particularly effective in applications with relatively small amounts of incident light or where a photodiode PD with large cathode capacitance Cpd is used.

In the fifth embodiment, a booster circuit 20 is provided in the pixel circuit 100. However, where a voltage higher than the supply voltage Vdd can be obtained from outside the pixel circuit 100, it is not necessary to provide the booster circuit 20, and the voltage from outside may be applied to the drain terminal of the current control transistor M11.

Moreover, it is possible to combine the structures of the fourth embodiment and the fifth embodiment. Such an arrangement allows a further widening of the dynamic range while suppressing the increase in circuit scale.

Also, it is possible to combine any of the structures of the first to third embodiments with the structure of the fourth or fifth embodiment. Such an arrangement allows a further widening of the dynamic range while suppressing the increase in circuit scale.

Also, in the above-described embodiments, circuit structures with the supply voltage Vdd line and the ground GND line reversed are possible. In such a case, in the fourth embodiment, a voltage higher than the supply voltage Vdd will be applied to the terminal of the overflow drain capacitor Cov on the side where the charge from the photodiode Pd does not flow in. Also, in the fifth embodiment, a negative voltage will be applied to the drain terminal of the current control transistor M10.

Also, in the above-described embodiments, the description has been given of a case where the transistors used in the pixel circuit 100 are mainly N-channel MOSFETs. However, this should not be considered as limiting and the arrangement may be such that some of the transistors is P-channel MOSFETs. In such a case, the high level and the low level of signals given to the gate are reversed as appropriate.

Also, in the above-described embodiments, the description has been about cases where the pixel circuit 100 is provided with a photodiode PD. However, any device, such as a phototransistor, may be used instead, so long as it is a photo detecting element capable of changing the flow of photocurrent in response to the incident light intensity.

While the preferred embodiments of the present invention have been described using specific terms, such description is for illustrative purposes only, and it is to be understood that changes and variations may be made without departing from the spirit or scope of the appended claims.

What is claimed is:

1. A photo detecting apparatus, comprising:
   a photo detecting element which generates a current in response to incident light;
   a first capacitance, caused by said photo detecting element, which is charged or discharged by the current flowing through said photo detecting element;
   a second capacitance, connected in parallel with said photo detecting element, which charges or discharges an electric charge overflowing from said first capacitance;
   a current control element, directly connected to a terminal of said second capacitance on a side where the electric charge flows in, which causes a current to cancel part of an electric charge when the electric charge overflowing from said first capacitance is stored in said second capacitance; and
   a detection circuit which detects a signal corresponding to the electric charge stored in said first capacitance and said second capacitance, wherein
   the current control element is constituted by a P-channel transistor wherein a drain terminal thereof is connected to the second capacitance, a predetermined fixed potential is applied to a source terminal thereof, and the gate terminal and the drain terminal thereof are connected with each other by way of a diode.

2. A photo detecting apparatus according to claim 1, said current control element being constituted by an N-channel transistor wherein a source terminal thereof is connected to said second capacitance, a predetermined fixed potential is applied to a drain terminal thereof, and the gate terminal and the source terminal thereof are connected with each other by way of a diode.

3. A photo detecting apparatus according to claim 2, further comprising:
   a current monitoring circuit which monitors the current flowing from said current control element by use of a dummy capacitance and a dummy transistor provided corresponding to said second capacitance and said current control element, respectively: and
   a correction circuit which removes a signal component read out from said current monitoring circuit, from the signal read out from said detection circuit.

4. A photo detecting apparatus according to claim 1, wherein said current control element is formed of a transistor, and a gate voltage of the transistor may be controlled in such a manner as to control a current that cancels part of an electric charge overflowing from said first capacitance.

5. A photo detecting apparatus according to claim 4, further comprising:
   a current monitoring circuit which monitors the current flowing from said current control element by use of a dummy capacitance and a dummy transistor provided corresponding to said second capacitance and said current control element, respectively: and
   a correction circuit which removes a signal component read out from said current monitoring circuit, from the signal read out from said detection circuit.

6. A photo detecting apparatus according to claim 1, further comprising:
   a current monitoring circuit which monitors the current flowing from said current control element by use of a dummy capacitance and a dummy transistor provided corresponding to said second capacitance and said current control element, respectively: and
   a correction circuit which removes a signal component read out from said current monitoring circuit, from the signal read out from said detection circuit.

7. A photo detecting apparatus according to claim 1, further comprising:
   a current monitoring circuit which monitors the current flowing from said current control element by use of a dummy capacitance and a dummy transistor provided corresponding to said second capacitance and said current control element, respectively: and
   a correction circuit which removes a signal component read out from said current monitoring circuit, from the signal read out from said detection circuit.

8. A photo detecting apparatus, comprising:
   a photo detecting element which generates a current in response to incident light;
   a first capacitance, caused by said photo detecting element, which is charged or discharged by the current flowing through said photo detecting element;
   a second capacitance, connected in parallel with said photo detecting element, which charges or discharges an electric charge overflowing from said first capacitance;
   a current control element, directly connected to a terminal of said second capacitance on a side where the electric charge flows in, which causes a current to cancel part of an electric charge when the electric charge overflowing from said first capacitance is stored in said second capacitance;
   a detection circuit which detects a signal corresponding to the electric charge stored in said first capacitance and said second capacitance, wherein
   the current control element increases the amount of the canceling current so that the charge stored in the second capacitance will not easily saturate even when the intensity of light is increased.

* * * * *